US009412066B1

(12) United States Patent
Satish

(10) Patent No.: US 9,412,066 B1
(45) Date of Patent: Aug. 9, 2016

(54) SYSTEMS AND METHODS FOR PREDICTING OPTIMUM RUN TIMES FOR SOFTWARE SAMPLES

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 453 days.

(21) Appl. No.: 13/794,720

(22) Filed: Mar. 11, 2013

(51) Int. Cl.
*G06F 7/60* (2006.01)
*G06N 5/02* (2006.01)

(52) U.S. Cl.
CPC .......................................... *G06N 5/02* (2013.01)

(58) Field of Classification Search
CPC . G06F 21/566; G06F 11/006; G06F 11/3428; G06F 11/3452; G06F 21/552; G06F 21/562; G06F 21/57; G06F 2221/2101; G06F 8/61; H04L 63/1416; G06N 5/02
USPC ............................................................ 703/2
See application file for complete search history.

(56) References Cited

U.S. PATENT DOCUMENTS

| | | | |
|---|---|---|---|
| 5,796,924 | A | 8/1998 | Errico et al. |
| 7,634,661 | B2 | 12/2009 | England et al. |
| 8,527,978 | B1 | 9/2013 | Sallam |
| 8,561,193 | B1 | 10/2013 | Srivastava et al. |
| 8,627,469 | B1 | 1/2014 | Chen et al. |
| 8,655,883 | B1 | 2/2014 | Yuksel |
| 2004/0249774 | A1 | 12/2004 | Caid et al. |
| 2009/0049550 | A1* | 2/2009 | Shevchenko ............ G06F 21/56 726/23 |
| 2010/0077481 | A1 | 3/2010 | Polyakov et al. |
| 2010/0083376 | A1 | 4/2010 | Pereira et al. |
| 2011/0107424 | A1 | 5/2011 | Singh et al. |
| 2012/0054184 | A1 | 3/2012 | Masud et al. |
| 2014/0207518 | A1 | 7/2014 | Kannan et al. |

OTHER PUBLICATIONS

Anderson, B., Improving Malware Classification: Bridging the Static/Dynamic Gap AISec 2012, Oct. 19, 2012, Raleigh, North Carolina USA.*
You, C., An Approach to Detect Malicious Behaviors by Evading Stalling Code, Telkomnika, vol. 10, No. 7, Nov. 2012, pp. 1766-1770 e-ISSN: 2087-278X.*

(Continued)

*Primary Examiner* — Kamini S Shah
*Assistant Examiner* — Scott S Cook
(74) *Attorney, Agent, or Firm* — ALG Intellectual Property, LLC

(57) ABSTRACT

A computer-implemented method for predicting optimum run times for software samples may include (1) identifying a set of training data that identifies (i) a plurality of static characteristics of at least one previously executed software sample and (ii) an amount of time taken by a software-analysis mechanism to observe a threshold level of run-time behaviors of the previously executed software sample, (2) identifying a plurality of static characteristics of an additional software sample, (3) determining that the static characteristics of the additional software sample and the previously executed software sample exceed a threshold level of similarity, and then (4) predicting an optimum run time for the additional software sample based at least in part on the amount of time taken by the software-analysis mechanism to observe the threshold level of run-time behaviors of the previously executed software sample. Various other methods, systems, and computer-readable media are also disclosed.

20 Claims, 7 Drawing Sheets

(56) References Cited

OTHER PUBLICATIONS

The RandomHouse College Dictionay, Revised Edition 1982.*
Li, P., Malware Clustering and Classification, The University of North Carolina at Chapel Hill, 2009.*
Sourabh Satish; Systems and Methods for Clustering Data Samples; U.S. Appl. No. 13/780,765, filed Feb. 28, 2013.
Wikipedia, "Cluster Analysis", http://en.wikipedia.org/wiki/Data_clustering#Comparison_between_data_clusterings, as accessed on Nov. 29, 2012.
Khorshidpour, Zeinab et al., "An Evolvable-Clustering-Based Algorithm to Learn Distance Function for Supervised Environment", IJCSI International Journal of Computer Science Issues, vol. 7, Issues 5, (Sep. 2010), pp. 374-381.
Barbará, Daniel, "Requirements for Clustering Data Streams", http://www.cs.iastate.edu/~honavar/datastreamcluster.pdf, as accessed Jan. 14, 2014, SIGKDD Explorations, vol. 3, Issue 2, (Jan. 2002), pp. 23-27.
Nguyen, Hai-Long et al., "Concurrent Semi-supervised Learning of Data Streams", http://link.springer.com/chapter/10.1007%2F978-3-642-23544-3_34, as accessed Jan. 14, 2014, Data Warehousing and Knowledge Discovery, 13th International Conference, DaWaK 2011, Lecture Notes in Computer Science vol. 6862, Springer Berlin Heidelberg, Toulouse, France, (Aug. 29-Sep. 2, 2011), pp. 445-459.
Valko, Michal et al., "Online Semi-Supervised Learning on Quantized Graphs", http://arxiv.org/ftp/arxiv/papers/1203/1203.3522.pdf, as accessed Jan. 14, 2014, Proceedings of the Twenty-Sixth Conference on Uncertainty in Artificial Intelligence (UAI2010), AUAI Press, Catalina Island, CA, (Jul. 8-11, 2010).

Goldberg, Andrew B., "OASIS: Online Active Semi-Supervised Learning", http://pages.cs.wisc.edu/~jerryzhu/pub/oasis.pdf, as accessed Jan. 14, 2014, Association for the Advancement of Artificial Intelligence, (2011).
Kholghi, Mahnoosh et al., "Active Learning Framework Combining Semi-Supervised Approach for Data Stream Mining", http://link.springer.com/chapter/10.1007%2F978-3-642-18134-4_38, as accessed Jan. 14, 2014, Intelligent Computing and Information Science, International Conference, ICICIS 2011, Proceedings, Part II, Communications in Computer and Information Science vol. 135, Springer Berlin Heidelberg, Chongqing, China, (Jan. 8-9, 2011), pp. 238-243.
Hu, Xin et al., "MutantX-S: Scalable Malware Clustering Based on Static Features", http://0b4af6cdc2f0c5998459-c0245c5c937c5dedcca3f1764ecc9b2f.r43.cf2.rackcdn.com/11753-atc13-hu.pdf, as accessed Jan. 14, 2014, 2013 USENIX Annual Technical Conference (USENIX ATC '13), USENIX Association, (2013), pp. 187-198.
Joseph H. Chen; Systems and Methods for Preventing Positive Malware Identification; U.S. Appl. No. 14/197,877, filed Mar. 5, 2014.
Sourabh Satish; Systems and Methods for Updating Generic File-Classification Definitions; U.S. Appl. No. 14/210,364, filed Mar. 13, 2014.
Sourabh Satish, et al.; Systems and Methods for Clustering Data; U.S. Appl. No. 14/214,581, filed Mar. 14, 2014.
Gonzalez, Teofilo F., "Clustering to Minimize the Maximum Intercluster Distance", https://www.cs.ucsb.edu/~teo/papers/Ktmm.pdf, as accessed Jan. 14, 2014, Theoretical Computer Science 38, North-Holland, Elsevier Science Publisher B.V., (1985), pp. 293-306.

* cited by examiner

```
                          Set of Training Data
                                 122
----------------------------------------------------------------------
******************************************

STATIC CHARACTERISTICS OF PREVIOUSLY EXECUTED SOFTWARE SAMPLE 124

Number of Executable Sections: 5
Sizes of Executable Sections:    45 Kilobytes
                                 36 Kilobytes
                                 52 Kilobytes
                                 32 Kilobytes
                                 42 Kilobytes
Number of Imported Functions:  10
Multimedia Library Dependency: Yes
Sample Class:                  Low Risk

RUN TIME FOR PREVIOUSLY EXECUTED SOFTWARE SAMPLE 124

Start Time:       07:30:00 AM
Stop Time:        10:30:00 AM
Total Run Time:   03:00:00
Date:             02/15/2013

RUN-TIME LOG OF PREVIOUSLY EXECUTED SOFTWARE SAMPLE 124
```

| BEHAVIOR COUNT | TIMESTAMP |
|---|---|
| 1 | 07:30:00 AM |
| ⋮ | ⋮ |
| 3000 | 07:50:45 AM |

SYSTEMS AND METHODS FOR PREDICTING OPTIMUM RUN TIMES FOR SOFTWARE SAMPLES

BACKGROUND

Software automation generally involves executing sample software programs to observe the behaviors exhibited by the sample programs over a predetermined period of time. For example, a software automation technology may execute a suspicious software program to observe whether the suspicious software program exhibits any potentially malicious behaviors within the first 30 minutes of execution. In another example, a software automation technology may execute an updated web browser to observe whether the updated web browser exhibits any unexpected glitches or bugs within the first 5 hours of execution. By executing and observing sample software programs over a sufficient period of time, software automation technologies may be able to gain a fairly accurate understanding as to the nature, health, and/or stability of the sample software programs.

Unfortunately, while conventional software automation technologies may be able to gain such an understanding, these software automation technologies may still suffer from one or more shortcomings and/or inefficiencies. For example, a conventional software automation technology may be unable to accurately predict how much time is needed to observe all of the interesting behaviors exhibited by a particular software program. On the one hand, in the event that the software program's run time is too long, the software automation technology may be dedicating too much time and/or too many resources to the sample software program. On the other hand, in the event that the software program's run time is too short, the software automation technology may run the risk of not observing certain interesting behaviors exhibited by the software program.

What is needed, therefore, are systems and methods for predicting optimum run times for sample software programs in order to sufficiently observe the sample software programs' behaviors without needlessly expending time and resources.

SUMMARY

As will be described in greater detail below, the instant disclosure generally relates to systems and methods for predicting optimum run times for software samples based at least in part on information known about previously executed software samples.

In one example, a computer-implemented method for predicting optimum run times for software samples may include (1) identifying a set of training data that identifies (i) a plurality of static characteristics of at least one software sample previously executed by at least one software-analysis mechanism and (ii) an amount of time taken by the software-analysis mechanism to observe a threshold level of run-time behaviors of the previously executed software sample, (2) identifying a plurality of static characteristics of an additional software sample, (3) determining that the static characteristics of the additional software sample and the static characteristics of the previously executed software sample exceed a threshold level of similarity by comparing the static characteristics of the additional software sample with the set of training data, and then (4) predicting an optimum run time for the additional software sample based at least in part on the amount of time taken by the software-analysis mechanism to observe the threshold level of run-time behaviors of the previously executed software sample.

In some examples, the method may also include determining the amount of time taken by the software-analysis mechanism to observe the threshold level of run-time behaviors of the previously executed software sample. For example, the method may include identifying a start time at which the software-analysis mechanism started executing the previously executed software sample and a threshold time at which the software-analysis mechanism finished observing the threshold level of run-time behaviors. In this example, the method may include calculating the amount of time taken by the software-analysis mechanism to observe the threshold level of run-time behaviors while executing the previously executed software sample based at least in part on the start time and the threshold time. Additionally or alternatively, the method may include calculating a time differential between the start time and the threshold time.

In some examples, the method may also include identifying a point in time at which the software-analysis mechanism entered into an idle state while executing the previously executed software sample. In such examples, the method may further include determining a specific number of run-time behaviors observed by the software-analysis mechanism at the point in time that the software-analysis mechanism entered into the idle state. Additionally or alternatively, the method may include receiving user input that identifies the threshold level of run-time behaviors.

In some examples, the method may also include creating a regression model used to predict the optimum run time for the additional software sample. In such examples, the method may further include training the regression model based at least in part on the set of training data. Additionally or alternatively, the method may include defining a set of sample classes that correspond to different subsets of static characteristics identified in the set of training data.

In some examples, the method may also include applying the regression model to the additional software sample. For example, the method may include using the regression model to identify a sample class within the set of sample classes that corresponds to a subset of static characteristics that exceed a threshold level of similarity with the static characteristics of the additional software sample. In this example, the method may include using the regression model to classify the additional software sample into the sample class since the sample class corresponds to the subset of static characteristics that exceed a threshold level of similarity with the static characteristics of the additional software sample. Additionally or alternatively, the method may include identifying the sample class within the set of sample classes into which the regression model previously classified the previously executed software sample.

In some examples, the method may also include identifying a run time that corresponds to the sample class. In some examples, the method may further include determining that the run time that corresponds to the sample class is the optimum run time for the additional software sample since the additional software sample has been classified into the sample class.

In some examples, the method may also include identifying a target software-analysis mechanism configured to execute the additional software sample in a target run-time environment. In such examples, the method may further include identifying at least one characteristic of the target run-time environment and then modifying the optimum run time for the additional software sample based at least in part on the characteristic of the target run-time environment.

In some examples, the method may also include identifying a maximum run time for the additional software sample. In such examples, the method may further include determining that the optimum run time for the additional software sample exceeds the maximum run time for the additional software sample. Additionally or alternatively, the method may include modifying the optimum run time by replacing the optimum run time with the maximum run time in response to determining that the optimum run time exceeds the maximum run time.

In some examples, the method may also include identifying a minimum run time for the additional software sample. In such examples, the method may further include determining that the optimum run time for the additional software sample is less than the minimum run time for the additional software sample. Additionally or alternatively, the method may include modifying the optimum run time by replacing the optimum run time with the minimum run time in response to determining that the optimum run time is less than the minimum run time.

In some examples, the method may also include identifying a target software-analysis mechanism configured to execute the additional software sample. In such examples, the method may further include directing the target software-analysis mechanism to execute the additional software sample for the optimum run time.

In one example, the threshold level of run-time behaviors may include a specific percentage of run-time behaviors observed by the software-analysis mechanism while executing the previously executed software sample. In another example, the threshold level of run-time behaviors may include a specific number of run-time behaviors observed by the software-analysis mechanism while executing the previously executed software sample. Additionally or alternatively, the threshold level of run-time behaviors may include all of the run-time behaviors observed by the software-analysis mechanism while executing the previously executed software sample.

In one embodiment, a system for implementing the above-described method may include (1) an identification module programmed to (a) identify a set of training data that identifies (i) a plurality of static characteristics of at least one software sample previously executed by at least one software-analysis mechanism and (ii) an amount of time taken by the software-analysis mechanism to observe a threshold level of run-time behaviors of the previously executed software sample and (b) identify a plurality of static characteristics of an additional software sample, (2) a determination module programmed to determine that the static characteristics of the additional software sample and the static characteristics of the previously executed software sample exceed a threshold level of similarity by comparing the static characteristics of the additional software sample with the set of training data, and (3) a prediction module programmed to predict an optimum run time for the additional software sample based at least in part on the amount of time taken by the software-analysis mechanism to observe the threshold level of run-time behaviors of the previously executed software sample. The system may also include at least one processor configured to execute the identification module, the determination module, and the prediction module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a computing device, may cause the computing device to (1) identify a set of training data that identifies (i) a plurality of static characteristics of at least one software sample previously executed by at least one software-analysis mechanism and (ii) an amount of time taken by the software-analysis mechanism to observe a threshold level of run-time behaviors of the previously executed software sample, (2) identify a plurality of static characteristics of an additional software sample, (3) determine that the static characteristics of the additional software sample and the static characteristics of the previously executed software sample exceed a threshold level of similarity by comparing the static characteristics of the additional software sample with the set of training data, and then (4) predict an optimum run time for the additional software sample based at least in part on the amount of time taken by the software-analysis mechanism to observe the threshold level of run-time behaviors of the previously executed software sample.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary set of training data.

Figure 1:
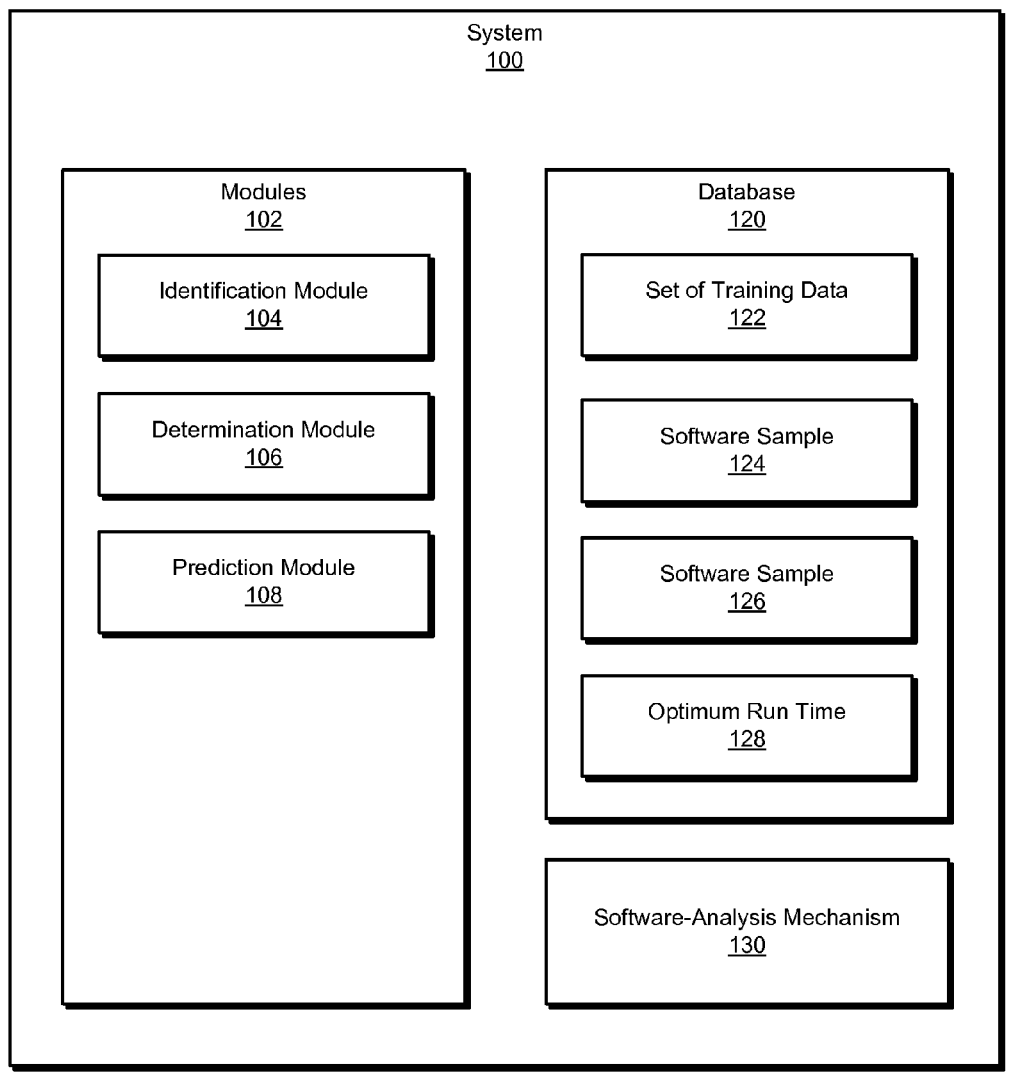
FIG. 1 is a block diagram of an exemplary system for predicting optimum run times for software samples.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for predicting optimum run times for software samples. As will be explained in greater detail below, by determining that the static characteristics of a soon-to-be executed software sample and the static characteristics of one or more previously executed software samples exceed a threshold level of similarity, the various systems and methods described herein may be able to fairly accurately predict an optimum run time for the soon-to-be executed software sample based at least in part on the amount of time needed to observe the interesting run-time behaviors exhibited by the previously executed software samples. By predicting the optimum run time for the soon-to-be executed software sample, the various systems and methods described herein may execute the software sample without needlessly expending time and/or resources to observe redundant and/or uninteresting behaviors exhibited by the software sample.

Figure 2:
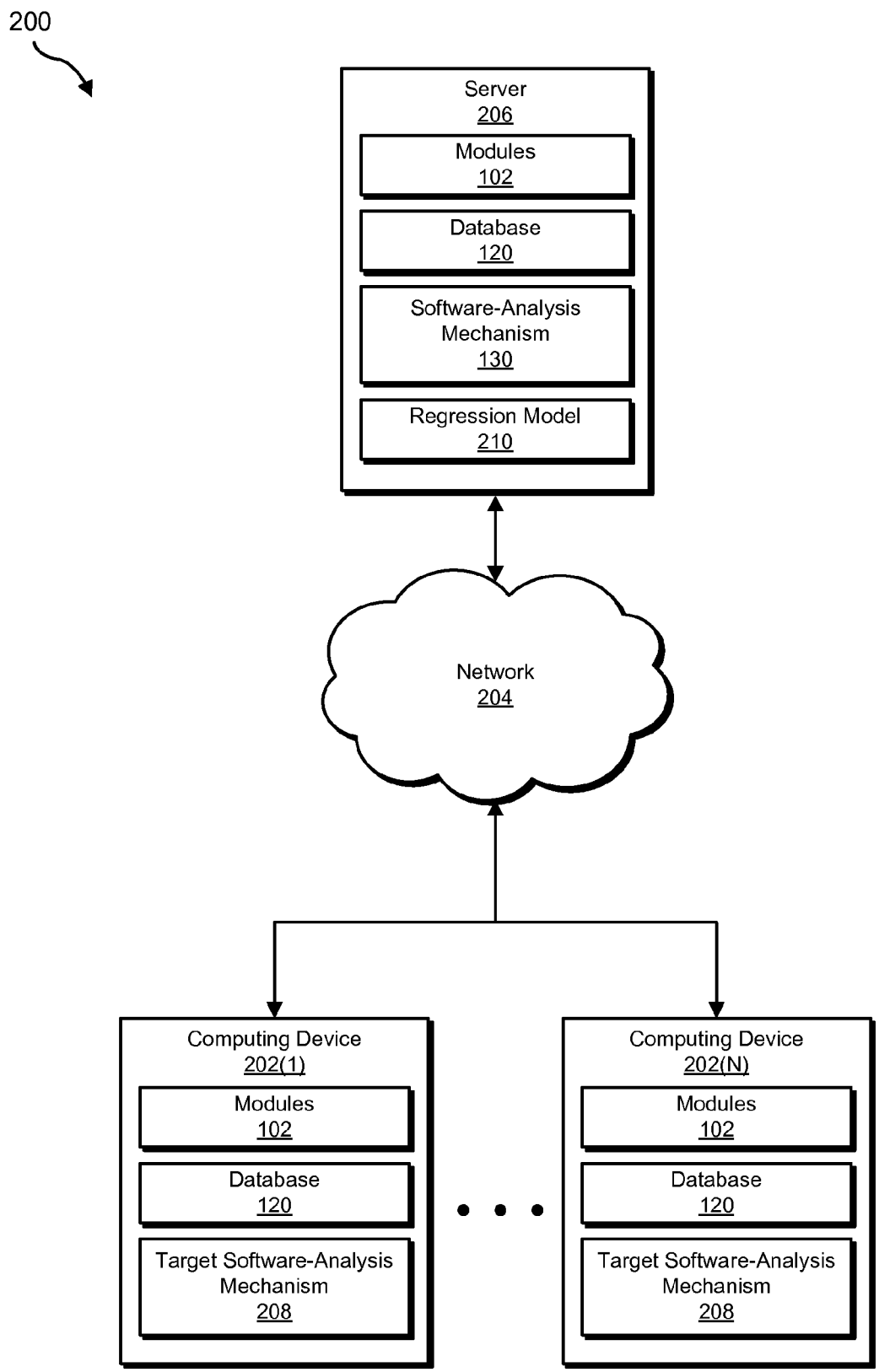
FIG. 2 is a block diagram of an exemplary system for predicting optimum run times for software samples.

The following will provide, with reference to FIGS. 1-2, detailed descriptions of exemplary systems for predicting optimum run times for software samples. Detailed descriptions of corresponding computer-implemented methods will be provided in connection with FIG. 3. Detailed descriptions of an exemplary set of training data will be provided in connection with FIG. 4. Detailed descriptions of exemplary static characteristics of a software sample will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for predicting optimum run times for software samples. As illustrated in this figure, exemplary system 100 may include one or more modules 102 for performing one or more tasks. For example, and as will be explained in greater detail below, exemplary system 100 may include an identification module 104 programmed to (1) identify a set of training data that identifies (i) a plurality of static characteristics of at least one software sample previously executed by at least one software-analysis mechanism and (ii) an amount of time taken by the software-analysis mechanism to observe a threshold level of run-time behaviors of the previously executed software sample and (2) identify a plurality of static characteristics of an additional software sample.

In addition, and as will be described in greater detail below, exemplary system 100 may include a determination module 106 programmed to determine that the static characteristics of the additional software sample and the static characteristics of the previously executed software sample exceed a threshold level of similarity by comparing the static characteristics of the additional software sample with the set of training data. Exemplary system 100 may also include a prediction module 108 programmed to predict an optimum run time for the additional software sample based at least in part on the amount of time taken by the software-analysis mechanism to observe the threshold level of run-time behaviors of the previously executed software sample. Although illustrated as separate elements, one or more of modules 102 in FIG. 1 may represent portions of a single module or application (such as a software automation program (e.g., software-analysis mechanism 130 in FIG. 1 and/or target software-analysis mechanism 208 in FIG. 2) or a regression model (e.g., regression model 210 in FIG. 2)).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store various data used to predict optimum run times for software samples. For example, database 120 may store software samples 124 and 126. The phrase "software sample," as used herein, generally refers to any type or form of at least a portion of a software program.

As illustrated in FIG. 1, database 120 may also store a set of training data 122. The phrase "training data," as used herein, generally refers to any type or form of data, statistics, and/or other information known about one or more previously executed software samples, the software-analysis mechanism(s) that executed such software samples, and/or the underlying hardware device(s) that executed the software-analysis mechanism(s). In one example, set of training data 122 may identify (1) a plurality of static characteristics of software sample 124 previously executed by at least one software-analysis mechanism (e.g., software-analysis mechanism 130 in FIG. 1 and/or target software-analysis mechanism 208 in FIG. 2) and (2) an amount of time taken by the software-analysis mechanism to observe a threshold level of run-time behaviors exhibited by previously executed software sample 124. In this example, set of training data 122 may also identify static characteristics of various other previously executed software samples and the amount of time needed to observe a threshold level of run-time behaviors exhibited by such software samples.

The phrase "static characteristic," as used herein, generally refers to any type or form of characteristic, attribute, and/or feature of a software sample that is capable of being identified without necessarily executing the software sample. Examples of such static characteristics include, without limitation, the number of executable sections included in a software sample, the respective sizes of the executable sections included in a software sample, the total size of a software sample, the number of functions imported and/or called by a software sample, the sample class into which a software sample has been classified, the file architecture and/or configuration of a software sample, whether a software sample has a particular dependency (such as a library dependency), whether a software sample is a native executable, whether a software sample includes managed code, and/or any other suitable static characteristics of a software sample.

The phrase "run-time behavior," as used herein, generally refers to any type or form of action, characteristic, attribute, and/or feature exhibited by a software sample during execution. Examples of run-time behaviors include, without limitation, any type or form of run-time behaviors indicative of the nature or purpose of a software sample, the health of a software sample (e.g., whether a software sample includes malware and/or performs a social-engineering attack), the stability of a software sample (e.g., whether a software sample includes glitches and/or bugs), and/or any other run-time behaviors exhibited by a software sample.

The phrase "threshold level of run-time behaviors," as used herein, generally refers to any type or form of predetermined percentage and/or quantity that represents a specific level of run-time behaviors exhibited by a software sample during execution. In one example, the threshold level of run-time behaviors may represent a specific percentage of the total number of run-time behaviors observed by a software-analysis mechanism (e.g., software-analysis mechanism 130 in FIG. 1 or target software-analysis mechanism 208 in FIG. 2) while executing software sample 124 over a predetermined period of time. In another example, the threshold level of run-time behaviors may represent a specific number of run-time behaviors observed by a software-analysis mechanism (e.g., software-analysis mechanism 130 in FIG. 1 or target software-analysis mechanism 208 in FIG. 2) while executing software sample 124 over the predetermined period of time.

As illustrated in FIG. 1, database 120 may also store an optimum run time 128 predicted for software sample 126 based at least in part on set of training data 122. The phrase "run time," as used herein, generally refers to any type or form of numerical value that represents a specific amount of time for which a software-analysis mechanism (e.g., software-analysis mechanism 130 in FIG. 1 or target software analysis mechanism 208 in FIG. 2) is to execute and/or observe a software sample. In addition, the term "optimum run time," as used herein, generally refers to any amount of time in which a software-analysis mechanism (e.g., software-analysis mechanism 130 in FIG. 1 or target software analysis mechanism 208 in FIG. 2) is reasonably likely to finish observing a threshold level of the run-time behaviors exhibited by a software sample.

Database 120 may represent portions of a single database or computing device or a plurality of databases or computing devices. For example, database 120 may represent a portion of one or more of computing devices 202(1)-(N) and/or server 206 in FIG. 2, a portion of computing system 610 in FIG. 6, and/or portions of exemplary network architecture 700 in FIG. 7. Alternatively, database 120 in FIG. 1 may represent one or more physically separate devices capable of being accessed by a computing device, such as one or more of computing devices 202(1)-(N) and/or server 206 in FIG. 2, computing system 610 in FIG. 6, and/or portions of exemplary network architecture 700 in FIG. 7.

As illustrated in FIG. 1, exemplary system 100 may also include one or more software-analysis mechanisms, such as software-analysis mechanism 130. The phrase "software-analysis mechanism," as used herein, generally refers to any type or form of software automation program capable of executing and/or analyzing software samples (e.g., software samples 124 and 126). In one example, while executing software sample 124 in a controlled automation environment, software-analysis mechanism 130 may observe and/or record the behaviors exhibited by software sample 124. In this example, by executing and observing software sample 124, software-analysis mechanism 130 may be able to gain a fairly accurate understanding as to the nature, health, and/or stability of software sample 124 and determine the amount of time needed to observe a threshold level of run-time behaviors exhibited by software sample 124.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. One or more of computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

As shown in FIG. 2, server 206 may include one or more of modules 102, database 120, software-analysis mechanism 130, and/or a regression model 210. The phrase "regression model," as used herein, generally refers to any type or form of heuristic and/or classifier capable of predicting and/or being used to predict optimum run times for the software samples (e.g., software samples 124 and 126). For example, regression model 210 may enable one or more of modules 102 and/or software-analysis mechanism 130 to predict an optimum run time for software sample 126 based at least in part on the static characteristics of software sample 126 and set of training data 122. In this example, by training (sometimes also referred to as "fitting") regression model 210 based at least in part on set of training data 122, one or more of modules 102 and/or software-analysis mechanism 130 may be able to fairly accurately predict an optimum run time for software sample 126 by applying regression model 210 to software sample 126.

As shown in FIG. 2, computing devices 202(1)-(N) may each include one or more of modules 102, database 120, and/or a target software-analysis mechanism 208. The phrase "target software-analysis mechanism," as used herein, generally refers to any type or form of software automation program capable of executing and/or analyzing software samples (e.g., software samples 124 and 126). In one example, after software-analysis mechanism 130 has predicted the optimum run time for software sample 126, software-analysis mechanism 130 may notify target software-analysis mechanism 208 of the optimum run time for software sample 126. In this example, by notifying target software-analysis mechanism 208 of the optimum run time for software sample 126, software-analysis mechanism 130 may ensure that target software-analysis mechanism 208 does not execute software sample 126 for a longer period of time than is needed to observe the interesting behaviors exhibited by software sample 126.

In one embodiment, one or more of modules 102 from FIG. 1 may, when executed by at least one processor of one or more of computing devices 202(1)-(N) and/or server 206, facilitate one or more of computing devices 202(1)-(N) and/or server 206 in predicting optimum run times for software samples. For example, and as will be described in greater detail below, one or more of modules 102 may cause one or more of computing devices 202(1)-(N) and/or server 206 to (1) identify set of training data 122 that identifies (i) a plurality of static characteristics of software sample 124 previously executed by at least one software-analysis mechanism (e.g., software-analysis mechanism 130 or target software-analysis mechanism 208) and (ii) an amount of time taken by the software-analysis mechanism to observe a threshold level of run-time behaviors of previously executed software sample 124, (2) identify a plurality of static characteristics of an additional software sample 126, (3) determine that the static characteristics of additional software sample 126 and the static characteristics of previously executed software sample 124 exceed a threshold level of similarity by comparing the static characteristics of additional software sample 126 with set of training data 122, and then (4) predict optimum run time 128 for additional software sample 126 based at least in part on the amount of time taken by the software-analysis mechanism to observe the threshold level of run-time behaviors of previously executed software sample 124.

Computing devices 202(1)-(N) generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device capable of facilitating predictions of optimum run times for software samples. Examples of server 206 include, without limitation, application servers, web servers, storage servers, and/or database servers configured to run certain software applications and/or provide various web, storage, and/or database services. Although illustrated as distinct elements, server 206 and computing devices 202(1)-(N) may all represent similar or even identical computing devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication among one or more of computing devices 202(1)-(N) and server 206.

Figure 3:
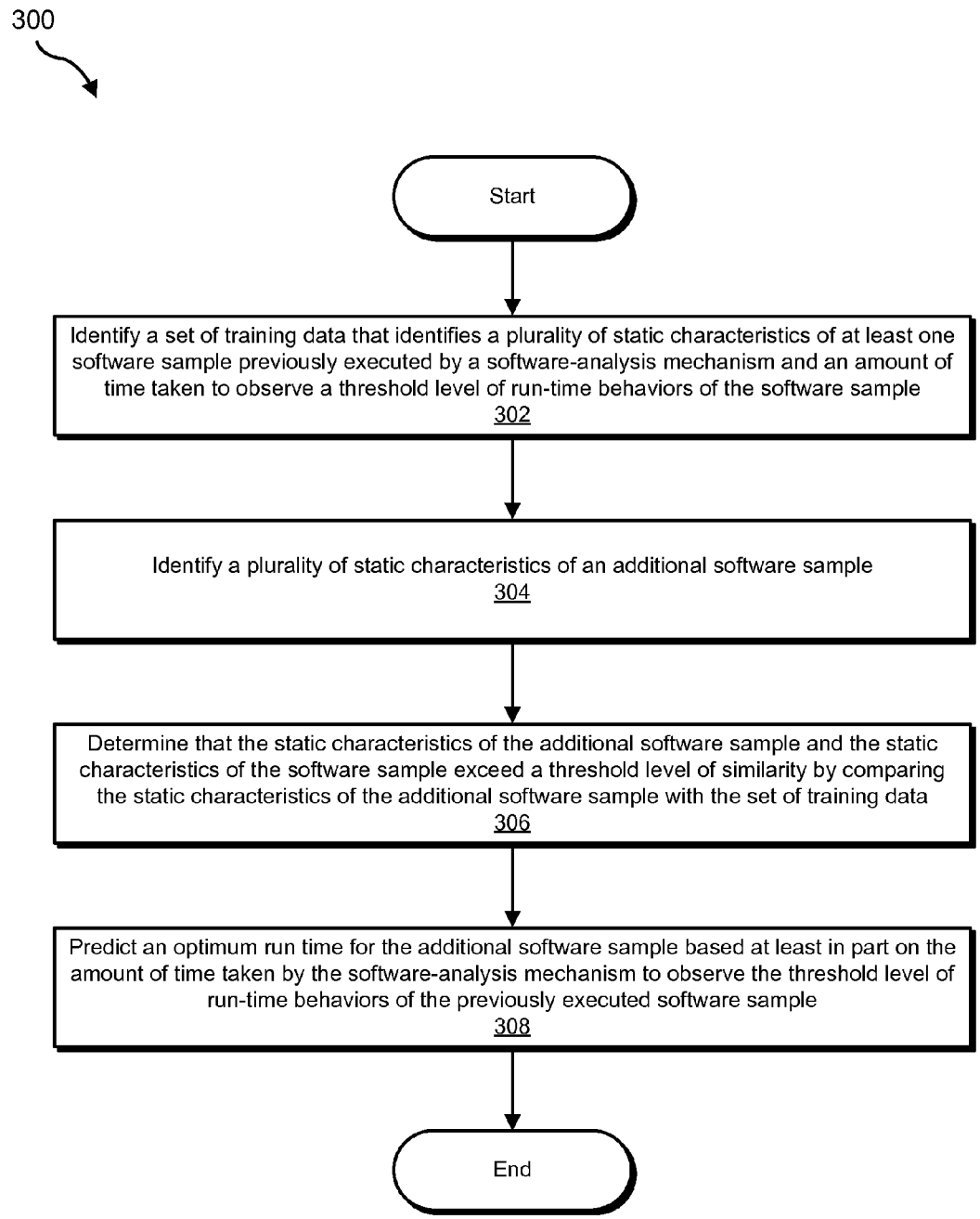
FIG. 3 is a flow diagram of an exemplary method for predicting optimum run times for software samples.

FIG. 3 is a flow diagram of an exemplary computer-implemented method 300 for predicting optimum run times for software samples. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a set of training data. For example, at step 302 identification module 104 may, as part of server 206 in FIG. 2, identify set of training data 122 stored in database 120. In this example, set of training data 122 may identify a plurality of static characteristics exhibited by software sample 124 during execution. Additionally or alternatively, set of training data 122 may identify the amount of time taken by software-analysis mechanism 130 to observe a threshold level of run-time behaviors exhibited by software sample 124 during execution.

The systems described herein may perform step 302 in a variety of ways. In one example, software-analysis mechanism 130 may create and/or populate set of training data 122 in database 120. For example, software-analysis mechanism 130 may analyze software sample 124 to identify one or more static characteristics of software sample 124. In this example, upon identifying the static characteristics of software sample 124 during the analysis, software-analysis mechanism 130 may create and/or populate set of training data 122 by adding the static characteristics of software sample 124 to database 120.

In some examples, software-analysis mechanism 130 may execute software sample 124 in a controlled automation environment and observe the various run-time behaviors exhibited by software sample 124 during execution. In one example, software-analysis mechanism 130 may identify and record a start time that indicates the point in time that software-analysis mechanism 130 started executing and observing software sample 124. For example, software-analysis mechanism 130 may identify and record "07:30:00 AM" (which corresponds to [hours]:[minutes]:[seconds] [12-hour clock indicator]) as the point in time that software-analysis mechanism 130 started executing and observing software sample 124. Upon identifying and recording the start time, software-analysis mechanism 130 may add the start time to set of training data 122 in database 120.

Additionally or alternatively, software-analysis mechanism 130 may identify and record a stop time that indicates the point in time that software-mechanism 130 stopped executing and observing software sample 124. For example, software-analysis mechanism 130 may identify and record "10:30:00 AM" (which corresponds to [hours]:[minutes]:[seconds] [12-hour clock indicator]) as the point in time that software-analysis mechanism 130 stopped executing and observing software sample 124. Upon identifying and recording the stop time, software-analysis mechanism 130 may add the stop time to set of training data 122 in database 120.

In some examples, software-analysis mechanism 130 may monitor the various run-time behaviors exhibited by software sample 124 between the start time and stop time. For example, software-analysis mechanism 130 may detect various run-time behaviors exhibited by software sample 124 over the 3-hour run-time period from "07:30:00 AM" to "10:30:00 AM" and account for each of the run-time behaviors in a run-time log. In this example, software-analysis mechanism 130 may also record a timestamp for each of the run-time behaviors in the run-time log such that the run-time log specifies the particular point in time that software sample 124 exhibited each of the run-time behaviors during the 3-hour run-time period. Upon accounting for the run-time behaviors and recording their timestamps in the run-time log, software-analysis mechanism 130 may add the run-time log to set of training data 122.

In one example, software-analysis mechanism 130 may account for the run-time behaviors in the run-time log by including an identification and/or a description of each of the run-time behaviors exhibited by software sample 124. In another example, software-analysis mechanism 130 may account for the run-time behaviors in the run-time log by including a numerical count or tally that identifies the total number of run-time behaviors exhibited by software sample 124.

In some examples, identification module 104 may analyze set of training data 122 to identify the static characteristics of previously executed software sample 124. As shown in FIG. 4, the static characteristics identified in set of training data 122 may include the number of executable sections included in software sample 124 (in this example, "5"), the respective sizes of the executable sections included in software sample 124 (in this example, "45 Kilobytes," "36 Kilobytes," "52 Kilobytes," "32 Kilobytes," and "42 Kilobytes"), the number of functions imported and/or called by software sample 124 (in this example, "10"), whether software sample 124 has a multimedia library dependency (in this example, "Yes"), and a class identifier that identifies a sample class into which software sample 124 has been classified (in this example, "Low Risk").

In some examples, identification module 104 may analyze set of training data 122 to identify the amount of time that software-analysis mechanism 130 executed and observed software sample 124. As shown in FIG. 4, set of training data 122 may identify the start time at which software-analysis mechanism 130 started executing and observing software sample 124 (in this example, "07:30:00 AM"), the stop time at which software-analysis mechanism 130 stopped executing and observing software sample 124 (in this example, "10:30:00 AM"), the total amount of time that software-analysis mechanism 130 executed and observed software sample 124 (in this example, "03:00:00," which corresponds to [hours]:[minutes]:[seconds]), and the date on which software-analysis mechanism 130 executed and observed software sample 124 (in this example, "02/15/2013").

In some examples, identification module 104 may analyze set of training data 122 to identify the threshold level of run-time behaviors exhibited by previously executed software sample 124. In one example, while analyzing set of training data 122, identification module 104 may identify a point in time at which software-analysis mechanism 130 entered into an idle state while executing software sample 124 based at least in part on the run-time log. As shown in FIG. 4, set of training data 122 may include a run-time log that identifies a count of the run-time behaviors exhibited by software sample 124 during the predetermined period of time (in this example, "1" through "3000") and a timestamp for each of these run-time behaviors (in this example, "07:30:00 AM" through "07:50:45 AM").

In one example, identification module 104 may determine the point in time that software-analysis mechanism 130 entered into the idle state based at least in part on the timestamp for the last run-time behavior observed by software-analysis mechanism 130. For example, while analyzing set of training data 122, identification module 104 may determine that software-analysis mechanism 130 did not observe any run-time behaviors exhibited by software sample 124 after "07:50:45 AM." In this example, identification module 104 may then determine that "07:50:45 AM" was the point in time that software-analysis mechanism 130 entered into the idle state since software-analysis mechanism 130 did not observe any run-time behaviors exhibited by software sample 124 after "07:50:45 AM."

Upon identifying the point in time that software-analysis mechanism 130 entered into the idle state, identification module 104 may determine the specific number of run-time behaviors observed by software-analysis mechanism 130 before this point in time. For example, while analyzing set of training data 122, identification module 104 may determine that software-analysis mechanism 130 observed "3000" run-time behaviors exhibited by software sample 124 before "07:50:45 AM." In this example, identification module 104 may then use "3000" as the threshold level of run-time behaviors since software-analysis mechanism 130 observed "3000" run-time behaviors before the point in time that software-analysis mechanism 130 entered into the idle state.

In another example, identification module 104 may receive user input that identifies the threshold level of run-time behaviors. For example, a lab analyst operating server 206 may provide identification module 104 with user input indicating that the threshold level of run-time behaviors is "100%" of the total number of run-time behaviors exhibited by software sample 124. In this example, identification module 104 may receive the user input provided by the lab analyst and then determine that the threshold level of run-time behaviors is "100%" of the total number of run-time behaviors exhibited by software sample 124 based at least in part on the user input.

Upon determining that the threshold level of run-time behaviors is "100%" of the total number of run-time behaviors, identification module 104 may convert the "100%" threshold level into a specific number of run-time behaviors. For example, while analyzing set of training data 122, identification module 104 may determine that software-analysis mechanism 130 observed a total of "3000" run-time behaviors exhibited by software sample 124. In this example, identification module 104 may then determine that "100%" of the "3000" run-time behaviors exhibited by software sample 124 is equivalent to "3000" run-time behaviors. Identification module 104 may then use "3000" as the threshold level of run-time behaviors since "100%" of the "3000" run-time behaviors exhibited by software sample 124 is equivalent to "3000" run-time behaviors.

In one example, identification module 104 may identify a threshold time at which software-analysis mechanism 130 finished observing the threshold level of run-time behaviors while executing software sample 124. For example, while analyzing set of training data 122, identification module 104 may determine that software-analysis mechanism 130 finished observing the "3000" run-time behaviors exhibited by software sample 124 at "07:50:45 AM." In this example, identification module 104 may then use "07:50:45 AM" as the threshold time since software-analysis mechanism 130 finished observing the "3000" run-time behaviors exhibited by software sample 124 at "07:50:45 AM."

In some examples, identification module 104 may calculate the amount of time taken by software-analysis mechanism 130 to observe the threshold level of run-time behaviors based at least in part on the start time and the threshold time. In one example, identification module 104 may calculate a time differential between the start time and threshold time. For example, identification module 104 may calculate "00:20:45" (which corresponds to [hours]:[minutes]:[seconds]) as the time differential by subtracting the "07:30:00 AM" start time from the "07:50:45 AM" threshold time. In this example, identification module 104 may use the "00:20:45" time differential as the amount of time taken by software-analysis mechanism 130 to observe the threshold level of run-time behaviors.

In some examples, one or more of modules 102 and/or software-analysis mechanism 130 may create regression model 210 used to predict an optimum run time for additional software sample 126 and/or one or more other software samples (not illustrated in FIG. 1 or 2). In one example, one or more of modules 102 and/or software-analysis mechanism 130 may train regression model 210 based at least in part on set of training data 122. For example, one or more of modules 102 and/or software-analysis mechanism 130 may train regression model 210 by applying one or more statistical techniques used to fit regression model 210 to set of training data 122. Examples of such statistical techniques include, without limitation, linear regression techniques, perceptron techniques, neural networking techniques, regression tree techniques, and/or any other suitable statistical techniques.

In some examples, identification module 104 may define a set of sample classes that correspond to different subsets of static characteristics identified in set of training data 122. For example, the lab analyst operating server 206 may provide identification module 104 with user input indicating that the static characteristics of software sample 124 identified in set of training data 122 suggest a "Low Risk" of malware. In this example, identification module 104 may receive the user input provided by the lab analyst and then define a sample class that corresponds to the static characteristics of software sample 124 identified in set of training data 122 based at least in part on the user input. This sample class may represent a "Low Risk" of malware since the static characteristics of software sample 124 identified in set of training data 122 suggest a "Low Risk" of malware.

Additionally or alternatively, the lab analyst operating server 206 may provide identification module 104 with user input indicating that the static characteristics of another software sample identified in set of training data 122 (not illustrated in FIG. 4) suggest a "High Risk" of malware. In this example, identification module 104 may receive the other user input provided by the lab analyst and then define another sample class that corresponds to the static characteristics of the other software sample identified in set of training data 122 based at least in part on the user input. This other sample class may represent a "High Risk" of malware since the static characteristics of the other software sample identified in set of training data 122 suggest a "High Risk" of malware.

In some examples, identification module 104 may apply a run time to each class within the set of classes. For example, identification module 104 may apply a run time of "00:20:45" to the "Low Risk" sample class since software sample 124 did not exhibit any run-time behaviors after running for "00:20:45." Additionally or alternatively, identification module 104 may apply a run time of "05:30:00" to the "High Risk" sample class since the other software sample represents a "High Risk" of malware.

As illustrated in FIG. 3, at step 304 one or more of the systems described herein may identify a plurality of static characteristics of an additional software sample. For example, at step 304 identification module 104 may, as part of at least one of server 206 and computing devices 202(1)-(N) in FIG. 2, identify a plurality of static characteristics of software sample 126. In this example, identification module 104 may identify the plurality of static characteristics of software sample 126 without executing software sample 126.

The systems described herein may perform step 304 in a variety of ways. In one example, software-analysis mechanism 130 may encounter software sample 126 on server 206 and start preparing to execute and observe software sample 126. As software-analysis mechanism 130 encounters software sample 126 on server 206, identification module 104 may, as part of server 206, identify the static characteristics of software sample 126 to facilitate predicting an optimum run time for software sample 126 based at least in part on set of training data 122.

Figure 5:
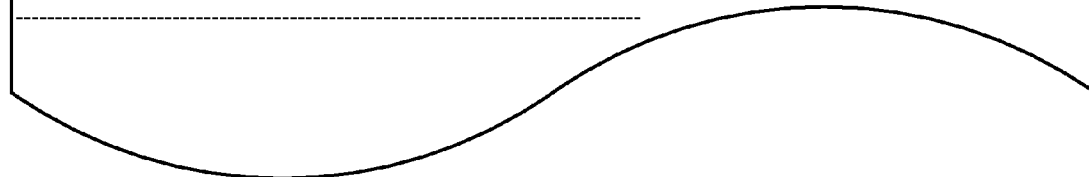
FIG. 5 is an illustration of exemplary static characteristics of a software sample.

As shown in FIG. 5, the static characteristics of software sample 126 may include the number of executable sections included in software sample 126 (in this example, "5"), the respective sizes of the executable sections included in software sample 126 (in this example, "45 Kilobytes," "38 Kilobytes," "54 Kilobytes," "30 Kilobytes," and "46 Kilobytes"), the number of functions imported and/or called by software sample 126 (in this example, "9"), and whether software sample 126 has a multimedia library dependency (in this example, "Yes").

In another example, target software-analysis mechanism 208 may encounter software sample 126 on computing device 202(1) and start preparing to execute and observe software sample 126. As target software-analysis mechanism 208 encounters software sample 126 on computing device 202(1), identification module 104 may, as part of computing device 202(1), identify the static characteristics of software sample 126. Upon identifying the static characteristics of software sample 126, identification module 104 may direct computing device 202(1) to send a communication that includes the static characteristics of software sample 126 to server 206 via network 204.

In one example, server 206 may receive the communication from computing device 202(1) via network 204. As server 206 receives the communication, identification module 104 may, as part of server 206, identify the static characteristics of software sample 126 included in the communication to facilitate predicting an optimum run time for software sample 126 based at least in part on set of training data 122.

As illustrated in FIG. 3, at step 306 one or more of the systems described herein may determine that the static characteristics of the additional software sample and the static characteristics of the previously executed software sample exceed a threshold level of similarity. For example, at step 306 determination module 106 may, as part of server 206 in FIG. 2, determine that the static characteristics of software sample 126 and the static characteristics of software sample 124 exceed a threshold level of similarity. The phrase "threshold level of similarity," as used herein, generally refers to any type or form of predetermined percentage and/or degree of similarity and/or likeness among the static characteristics of a plurality of software samples.

The systems described herein may perform step 306 in a variety of ways. In one example, determination module 106 may compare the static characteristics of software samples 126 and 124. For example, determination module 106 may compare the number of executable sections included in software samples 126 and 124, the respective sizes of the executable sections included in software samples 126 and 124, the number of functions imported and/or called by software samples 126 and 124, and whether software samples 126 and 124 each have a multimedia library dependency. In this example, upon comparing the static characteristics of software samples 126 and 124, determination module 106 may determine that the static characteristics of software samples 126 and 124 exceed the threshold level of similarity.

In one example, determination module 106 may weight some static characteristics more than other static characteristics when determining whether the static characteristics of software samples 126 and 124 exceed the threshold level of similarity. For example, determination module 106 may create an algorithmic formula used to determine whether the static characteristics of software samples 126 and 124 exceed the threshold level of similarity. In this example, determination module 106 may weight the algorithmic formula such that the number of executable sections is more influential than the number of imported functions in determining whether the static characteristics of software samples 126 and 124 exceed the threshold level of similarity.

In one example, determination module 106 may determine that the static characteristics of software sample 126 and 124 exceed the threshold level of similarity by applying the regression model 210 to software sample 126. For example, determination module 106 may use regression model 210 to determine that the "High Risk" sample class corresponds to static characteristics (which originated from software sample 124) that exceed a threshold level of similarity with the static characteristics of software sample 126. In this example, determination module 106 may then classify software sample 126 into the "Low Risk" sample class since the "Low Risk" sample class corresponds to static characteristics that exceed the threshold level of similarity with the static characteristics of software sample 126.

Additionally or alternatively, determination module 106 may identify a class identifier that identifies the sample class into which software sample 124 has been classified. For example, determination module 106 may identify the "Low Risk" class identifier within the static characteristics of software sample 124 identified in set of training data 122 in FIG. 4. In this example, determination module 106 may then classify software sample 126 into the "Low Risk" sample class since the "Low Risk" class identifier indicates that software sample 124 has been classified into the "Low Risk" sample class.

As illustrated in FIG. 3, at step 308 one or more of the systems described herein may predict an optimum run time for the additional software sample based at least in part on the amount of time taken by the software-analysis mechanism to observe the threshold level of run-time behaviors of the previously executed software sample. For example, at step 308 prediction module 108 may, as part of server 206 in FIG. 2, predict an optimum run time for software sample 126 based at least in part on the amount of time taken by software-analysis mechanism 130 to observe the threshold level of run-time behaviors of software sample 124. In this example, prediction module 108 may initiate predicting the optimum run time for software sample 126 in response to the determination that the static characteristics of software samples 126 and 124 exceed the threshold level of similarity.

The systems described herein may perform step 308 in a variety of ways. In one example, prediction module 108 may identify the run time that corresponds to the sample class into which software sample 126 was classified. For example, prediction module 108 may identify "00:20:45" as the run time applied to the "Low Risk" sample class. In this example, prediction module 108 may then determine that the "00:20:45" is the optimum run time for software sample 126 since software sample 126 has been classified into the sample class.

In one example, in the event that target software-analysis mechanism 208 is preparing to execute and observe software sample 126 on computing device 202(1), prediction module 108 may identify at least one characteristic of the target run-time environment on computing device 202(1). For example, prediction module 108 may identify the make and model of computing device 202(1). In this example, prediction model 108 may then modify the "00:20:45" optimum run time for software sample 126 based at least in part on the make and model of computing device 202(1).

Examples of characteristics of the target run-time environment include, without limitation, the make and model of the computing device that corresponds to the target run-time environment, the operating system installed on the computing device that corresponds to the target run-time environment, the hardware architecture of the computing device that corresponds to the target run-time environment, the configuration settings applied to the target run-time environment, and/or any other suitable characteristics of the target run-time environment.

In one example, prediction module 108 may identify a minimum run time for software sample 126. For example, the lab analyst operating server 206 may provide prediction module 108 with user input indicating that the minimum run time for software samples executed and observed by software-analysis mechanism 130 is "00:30:00." In this example, prediction module 108 may receive the user input provided by the lab analyst and apply the "00:30:00" minimum run time indicated by the user input to all of the software samples executed and observed by software-analysis mechanism 130.

In one example, prediction module 108 may determine that the optimum run time for software sample 126 is less than the minimum run time. For example, prediction module 108 may determine that the "00:20:45" optimum run time for software sample 126 is less than the "00:30:00" minimum run time. In response to this determination, prediction module 108 may modify the "00:20:45" optimum run time for software sample 126 by replacing the "00:20:45" optimum run with the "00:30:00" minimum run time.

In another example, prediction module 108 may identify a maximum run time for software sample 126. For example, the lab analyst operating server 206 may provide prediction module 108 with user input indicating that the maximum run time for software samples executed and observed by software-analysis mechanism 130 is "00:15:00." In this example, prediction module 108 may receive the user input provided by the lab analyst and apply the "00:15:00" maximum time indicated by the user input to all of the software samples executed and observed by software-analysis mechanism 130.

In one example, prediction module 108 may determine that the optimum run time for software sample 126 exceeds the maximum run time. For example, prediction module 108 may determine that the "00:20:45" optimum run time for software sample 126 exceeds the "00:15:00" minimum run time. In response to this determination, prediction module 108 may modify the "00:20:45" optimum run time for software sample 126 by replacing the "00:20:45" optimum run with the "00:15:00" minimum run time.

In one example, upon predicting the optimum run time for software sample 126, prediction module 108 may direct software-analysis mechanism 130 to execute software sample 126 on server 206 for the optimum run time. In another example, upon predicting the optimum run time for software sample 126, prediction module 108 may direct target software-analysis mechanism 208 to execute software sample 124 on computing device 202(1) for the optimum run time.

As explained above in connection with method 300 in FIG. 3, a software-analysis mechanism may execute a software sample and observe the run-time behaviors exhibited by the software sample during execution. In one example, the software-analysis mechanism may add various information about the software sample to a set of training data used to predict optimum run times for additional software samples. For example, the software-analysis mechanism may add various static characteristics of the software sample and/or a run-time log of the behaviors exhibited by the software sample to the set of training data.

In one example, the software-analysis mechanism may encounter an additional software sample. In this example, the software-analysis mechanism may identify various static characteristics of the additional software sample. The software-analysis mechanism may compare the static characteristics of the additional software sample with the static characteristics of the software sample added to the set of training data. The software-analysis mechanism may then determine that the static characteristics of the software sample and the additional software sample are similar based at least in part on this comparison.

In one example, the software-analysis mechanism may predict an optimum run time for the additional software sample based at least in part on the run-time log added to the set of training data. For example, the software-analysis mechanism may analyze the run-time log added to the set of training data to identify the start time at which software-analysis mechanism started executing the software sample and the point in time that the software sample stopped exhibiting run-time behaviors during execution. In this example, the software-analysis mechanism may then calculate a time differential between the start time and the point in time that the software sample stopped exhibiting run-time behaviors during execution.

In one example, the software-analysis mechanism may use the time differential as the optimum run time for the additional software sample. In another example, the software-analysis mechanism may predict the optimum run time for the additional software sample by manipulating the time differential based on at least one characteristic of the target run-time environment. Upon predicting the optimum run time for the additional software sample, the software-analysis mechanism may execute and observe the additional software sample for the optimum run time.

Accordingly, by determining that the static characteristics of a soon-to-be executed software sample and the static characteristics of one or more previously executed software samples are similar, the various systems and methods described herein may be able to fairly accurately predict an optimum run time for the soon-to-be executed software sample based at least in part on the amount of time needed to observe the interesting run-time behaviors exhibited by the previously executed software samples. By predicting the optimum run time for the soon-to-be executed software sample, the various systems and methods described herein may execute the software sample without needlessly expending time and/or resources to observe redundant and/or uninteresting behaviors exhibited by the software sample.

Figure 6:
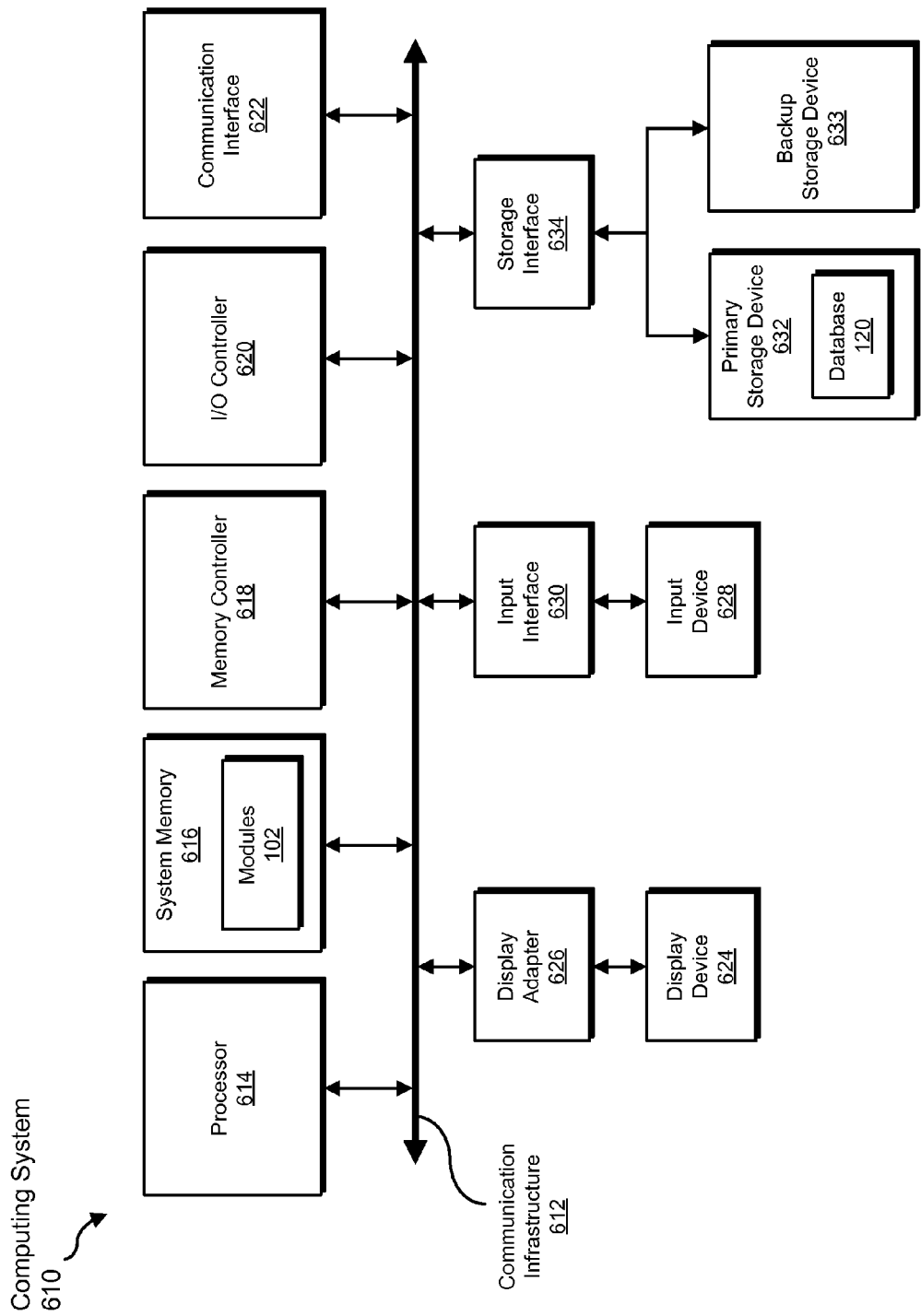
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, determining, predicting, calculating, receiving, creating, training, defining, applying, classifying, and directing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
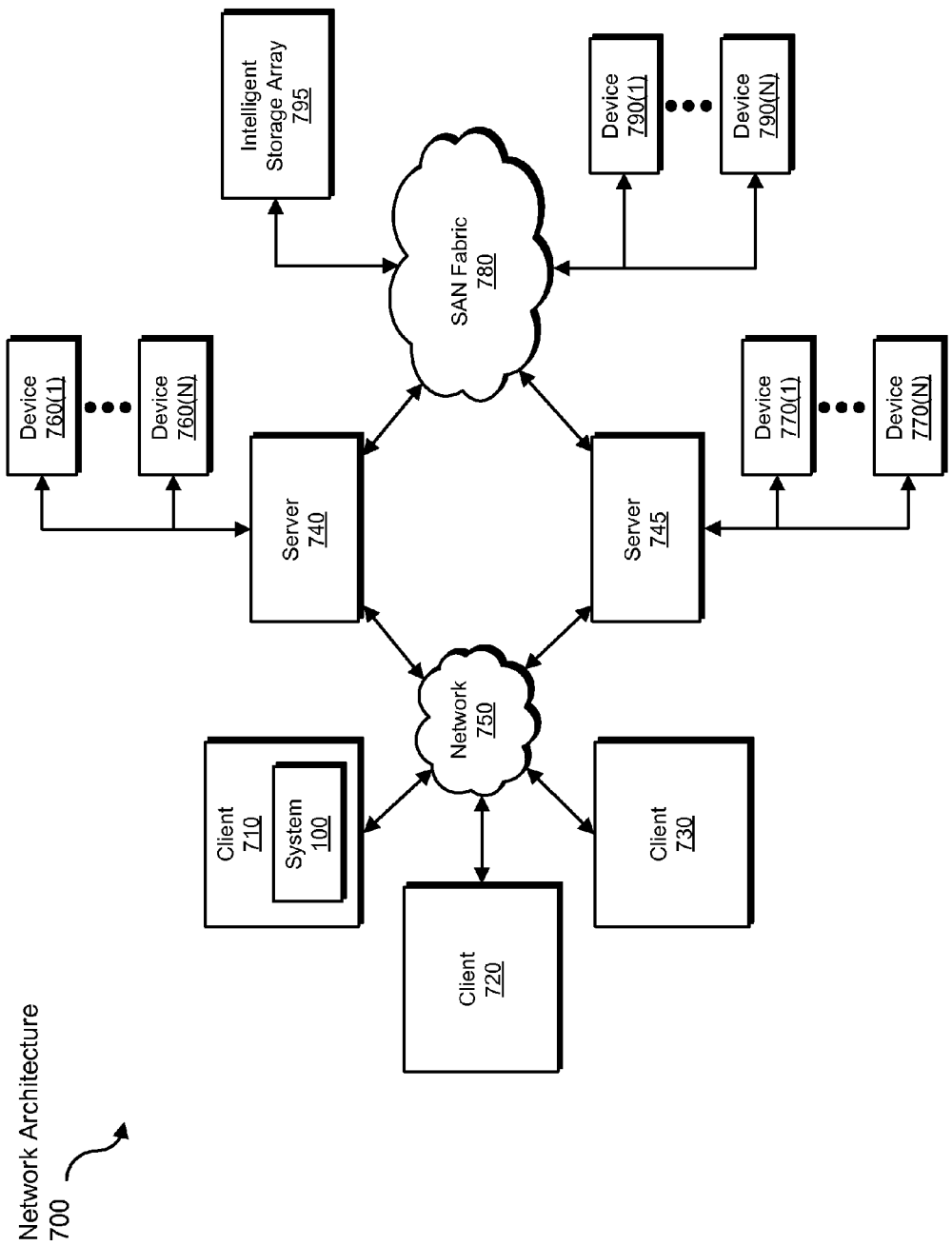
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, predicting, calculating, receiving, creating, training, defining, applying, classifying, and directing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for predicting optimum run times for software samples.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive training data to be transformed, transform the training data, output a result of the transformation, use the result of the transformation to predict an optimum run time for a software sample, and store the result of the transformation with the optimum run time for the software sample. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for predicting optimum run times for software samples, at least a portion of the method being performed by a computing device comprising at least one processor, the method comprising:
    identifying a set of training data that identifies:
        a plurality of static characteristics of at least one software sample previously executed by at least one software-analysis mechanism;

an amount of time taken by the software-analysis mechanism to observe a threshold level of run-time behaviors of the previously executed software sample by:
  identifying a start time at which the software-analysis mechanism started executing the software sample;
  identifying a threshold time at which the software-analysis mechanism finished observing the threshold level of run-time behaviors while executing the software sample;
  calculating the amount of time taken by the software-analysis mechanism to observe the threshold level of run-time behaviors while executing the software sample based at least in part on the start time and the threshold time;
identifying a plurality of static characteristics of an additional software sample;
determining that the static characteristics of the additional software sample and the static characteristics of the previously executed software sample exceed a threshold level of similarity by comparing the static characteristics of the additional software sample with the set of training data;
in response to determining that the static characteristics of the additional software sample and the static characteristics of the previously executed software sample exceed a threshold level of similarity, predicting an optimum run time for the additional software sample based at least in part on the amount of time taken by the software-analysis mechanism to observe the threshold level of run-time behaviors of the previously executed software sample, the optimum run time comprising a specific amount of time that the software-analysis mechanism is to execute the additional software sample such that, after executing the additional software sample for the specific amount of time, the software-analysis mechanism is to stop executing the additional software sample.

2. The method of claim 1, wherein identifying the set of training data comprises determining the amount of time taken by the software-analysis mechanism to observe the threshold level of run-time behaviors of the previously executed software sample.

3. The method of claim 1, wherein calculating the amount of time taken by the software-analysis mechanism to observe the threshold level of run-time behaviors comprises calculating a time differential between the start time and the threshold time.

4. The method of claim 1, further comprising identifying the threshold level of run-time behaviors by receiving user input that identifies the threshold level of run-time behaviors.

5. The method of claim 1, further comprising identifying the threshold level of run-time behaviors by:
  identifying a point in time at which the software-analysis mechanism entered into an idle state while executing the software sample;
  determining a specific number of run-time behaviors observed by the software-analysis mechanism at the point in time that the software-analysis mechanism entered into the idle state.

6. The method of claim 1, further comprising:
creating a regression model used to predict the optimum run time for the additional software sample;
training the regression model based at least in part on the set of training data.

7. The method of claim 6, wherein training the regression model based at least in part on the set of training data comprises defining a set of sample classes that correspond to different subsets of static characteristics identified in the set of training data.

8. The method of claim 7, wherein determining that the static characteristics of the additional software sample and the static characteristics of the previously executed software sample exceed a threshold level of similarity comprises applying the regression model to the additional software sample to:
  identify a sample class within the set of sample classes that corresponds to a subset of static characteristics that exceed a threshold level of similarity with the static characteristics of the additional software sample;
  classify the additional software sample into the sample class since the sample class corresponds to the subset of static characteristics that exceed a threshold level of similarity with the static characteristics of the additional software sample.

9. The method of claim 8, wherein identifying the sample class comprises:
  upon determining that the static characteristics of the additional software sample and the static characteristics of the previously executed software sample exceed the threshold level of similarity, identifying the sample class within the set of sample classes into which the regression model previously classified the previously executed software sample.

10. The method of claim 8, wherein predicting the optimum run time for the additional software sample comprises:
  identifying a run time that corresponds to the sample class;
  determining that the run time that corresponds to the sample class is the optimum run time for the additional software sample since the additional software sample has been classified into the sample class.

11. The method of claim 1, wherein predicting the optimum run time for the additional software sample comprises:
  identifying a target software-analysis mechanism configured to execute the additional software sample in a target run-time environment;
  identifying at least one characteristic of the target run-time environment;
  modifying the optimum run time for the additional software sample based at least in part on the characteristic of the target run-time environment.

12. The method of claim 1, wherein predicting the optimum run time for the additional software sample comprises:
  identifying a maximum run time for the additional software sample;
  determining that the optimum run time for the additional software sample exceeds the maximum run time for the additional software sample;
  in response to determining that the optimum run time exceeds the maximum run time, modifying the optimum run time by replacing the optimum run time with the maximum run time.

13. The method of claim 1, wherein predicting the optimum run time for the additional software sample comprises:
  identifying a minimum run time for the additional software sample;
  determining that the optimum run time for the additional software sample is less than the minimum run time for the additional software sample;

in response to determining that the optimum run time is less than the minimum run time, modifying the optimum run time by replacing the optimum run time with the minimum run time.

14. The method of claim 1, further comprising:
identifying a target software-analysis mechanism configured to execute the additional software sample;
directing the target software-analysis mechanism to execute the additional software sample for the optimum run time.

15. The method of claim 1, wherein the threshold level of run-time behaviors comprises a specific percentage of run-time behaviors observed by the software-analysis mechanism while executing the software sample.

16. The method of claim 1, wherein the threshold level of run-time behaviors comprises a specific number of run-time behaviors observed by the software-analysis mechanism while executing the software sample.

17. The method of claim 1, wherein the threshold level of run-time behaviors comprises all of the run-time behaviors observed by the software-analysis mechanism while executing the software sample.

18. A system for predicting optimum run times for software samples, the system comprising:
an identification module stored in memory and programmed to:
identify a set of training data that identifies:
a plurality of static characteristics of at least one software sample previously executed by at least one software-analysis mechanism;
an amount of time taken by the software-analysis mechanism to observe a threshold level of run-time behaviors of the previously executed software sample by:
identifying a start time at which the software-analysis mechanism started executing the software sample;
identifying a threshold time at which the software-analysis mechanism finished observing the threshold level of run-time behaviors while executing the software sample;
calculating the amount of time taken by the software-analysis mechanism to observe the threshold level of run-time behaviors while executing the software sample based at least in part on the start time and the threshold time;
identify a plurality of static characteristics of an additional software sample;
a determination module stored in memory and programmed to determine that the static characteristics of the additional software sample and the static characteristics of the previously executed software sample exceed a threshold level of similarity by comparing the static characteristics of the additional software sample with the set of training data;
a prediction module stored in memory and programmed to predict an optimum run time for the additional software sample based at least in part on the amount of time taken by the software-analysis mechanism to observe the threshold level of run-time behaviors of the previously executed software sample, the optimum run time comprising a specific amount of time that the software-analysis mechanism is to execute the additional software sample such that, after executing the additional software sample for the specific amount of time, the software-analysis mechanism is to stop executing the additional software sample;
at least one physical processor configured to execute the identification module, the determination module, and the prediction module.

19. A non-transitory computer-readable-storage medium comprising one or more computer-executable instructions that, when executed by at least one processor of a computing device, cause the computing device to:
identify a set of training data that identifies:
a plurality of static characteristics of at least one software sample previously executed by at least one software-analysis mechanism;
an amount of time taken by the software-analysis mechanism to observe a threshold level of run-time behaviors of the previously executed software sample by:
identifying a start time at which the software-analysis mechanism started executing the software sample;
identifying a threshold time at which the software-analysis mechanism finished observing the threshold level of run-time behaviors while executing the software sample;
calculating the amount of time taken by the software-analysis mechanism to observe the threshold level of run-time behaviors while executing the software sample based at least in part on the start time and the threshold time;
identify a plurality of static characteristics of an additional software sample;
determine that the static characteristics of the additional software sample and the static characteristics of the previously executed software sample exceed a threshold level of similarity by comparing the static characteristics of the additional software sample with the set of training data;
predict an optimum run time for the additional software sample based at least in part on the amount of time taken by the software-analysis mechanism to observe the threshold level of run-time behaviors of the previously executed software sample, the optimum run time comprising a specific amount of time that the software-analysis mechanism is to execute the additional software sample such that, after executing the additional software sample for the specific amount of time, the software-analysis mechanism is to stop executing the additional software sample.

20. The method of claim 1, wherein predicting the optimum run time for the additional software sample comprises applying, as the optimum run time for the additional software sample, the amount of time taken by the software-analysis mechanism to observe the threshold level of run-time behaviors of the previously executed software sample.

* * * * *